July 3, 1928.  
F. S. CARR  
1,675,788  
FASTENER  
Original Filed Feb. 26, 1925
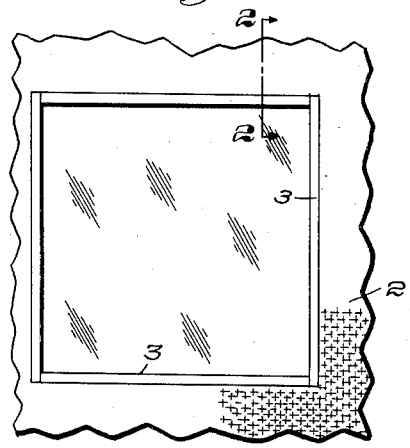
Fig.1
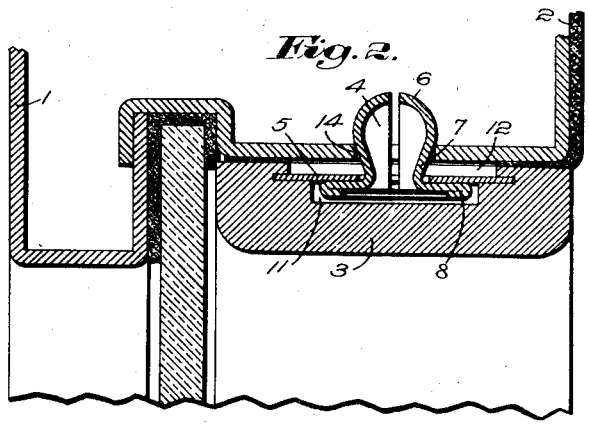
Fig.2.
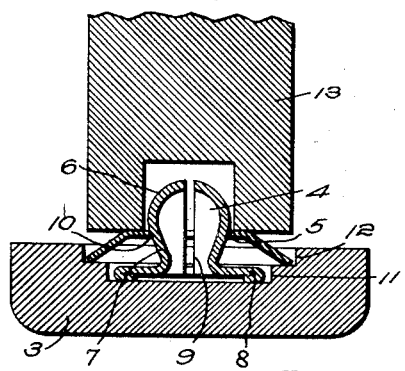
Fig.3.
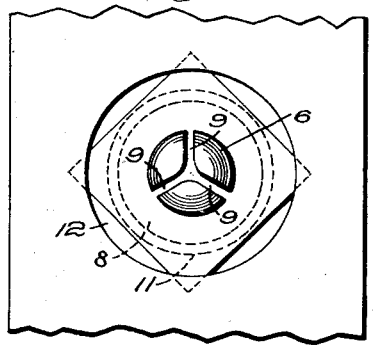
Fig.4.
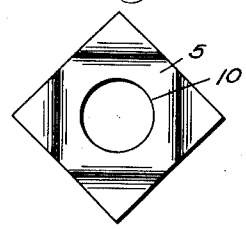
Fig.5.
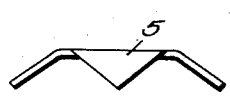
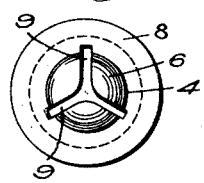
Fig.6.
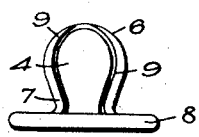
Inventor:  
Fred S. Carr,  
by Emery Booth Janney & Varney  
Attys.

Patented July 3, 1928.

1,675,788

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Original application filed February 26, 1925, Serial No. 11,696. Divided and this application filed August 25, 1925. Serial No. 52,318.

This invention aims to provide improvements in separable fasteners.

The application is a division of my prior application, Serial No. 11,696, filed February 26, 1925.

In the drawings, which illustrate a preferred embodiment of my invention:—

Figure 1 is an elevational view of a window and window frame portion of a vehicle body showing one use of my invention;

Fig. 2 is a section on the line 2—2 of Fig. 1, showing the trim strip secured to the window frame by stud and socket means;

Fig. 3 is a section of the trim strip showing the stud parts of a separable fastener being secured thereto;

Fig. 4 is a fragmentary elevation view of a portion of the trim strip showing the stud elements secured thereto;

Fig. 5 includes a plan and a side elevation of the attaching part of a fastener stud; and Fig. 6 includes a plan and a side elevation of the socket-engaging part of a fastener stud.

Referring to the drawings, I have shown one of the uses of a quick detachable trimming strip. The trimming installation includes a body part 1, which may be the body of an automobile, an upholstery fabric 2 covering portions of the inside of the body and a wooden trim strip 3 secured to the body 1 by a plurality of separable stud and socket fastening elements. All the above mentioned parts except the stud elements are substantially as shown and more fully described in my copending application Serial No. 11,696, filed February 26th, 1925.

The stud elements as illustrated include a socket-engaging part 4 and an attaching plate 5. The socket-engaging part has a head 6, a neck 7 and a reinforced base portion 8, and is provided with slots 9 which extend from the top of the head into the base 8 (Fig. 6) to permit contraction and expansion of the head 6. The base portion has its edge turned back upon itself to add strength thereto to prevent the base portion from splitting adjacent the slots 9. The attaching plate 5 is formed from a dish-shaped cross-section (Fig. 3). An aperture 10 is provided in the center of the attaching plate 5 for purposes hereinafter more fully described.

To assemble the studs with the wooden strip 3, I first drill two concentric recesses in the strip 3 at the inner face thereof. The smaller recess 11 receives the base 8 of the socket-engaging part 4 and the larger recess receives the attaching plate 5. First the stud is placed in the recess 11 and the attaching plate is then placed over the head 6 and neck 7 of the stud, as best illustrated in Fig. 3. I prefer to have the head of the stud snap through the aperture in the attaching plate as an initial means of assembling the stud element. The neck of the stud is therefore made sufficiently small enough in diameter so that the stud may shift sufficiently when the attaching plate is pressed into place, as illustrated in Fig. 2.

A suitable tool 13 (Fig. 3) then presses the plate 5 toward the base 8 of the stud, thereby flattening the corners of the plate and forcing them into the wall surrounding the recess 12 as shown in Fig. 2. Thus the plate 5 is countersunk into the strip 3 to hold the socket-engaging part 4 in assembled relation therewith so that only the head and neck of each stud extends beyond the inner face of the strip.

The base 8 of the socket-engaging part 4 is of a smaller diameter than the diameter of its recess 11 and the aperture 10 in the attaching plate is larger than the diameter of the neck of the stud, thereby permitting lateral shifting of the stud relative to the attaching plate 5 and the trim strip 3 for alignment with a stud-receiving aperture 14 presented by the body part 1.

By securing the stud members to the strip in the above-mentioned manner, the strip may fit tightly against the upholstery fabric 2 and the frame 1 to provide a finished edge. I have found that trim strips secured to the frame parts of the car by stud and socket elements hold very firmly when applied and may be easily and quickly removed for access to mechanical parts of the car underlying the upholstery.

While I have shown and described a preferred embodiment of my invention, it will be understood that changes involving omission, substitution, alteration and reversal of parts may be made without departing from the scope of my invention, which is best defined in the appended claims.

Claims:

1. A fastener unit comprising a stud and a stud-attaching plate, said plate presenting a plurality of point portions dished prior to attachment of the unit to a stud-carrying medium but in use being flattened to extend laterally from said plate to engage said stud-carrying medium and secure the stud in position.

2. A fastener comprising, in combination, a stud having a head, a neck and a base and a dished stud-attaching part adapted to be flattened to secure the stud to a support, said attaching part having an aperture therethrough larger in diameter than said neck to permit lateral shifting of said stud relative to said attaching part when said head is entered therethrough.

3. A fastener comprising, in combination, a resilient stud having a head, a neck and a base, said head split to provide resiliency and a dished stud-attaching part adapted to be flattened to secure the stud to a support, said attaching part having an aperture therethrough larger than said neck to permit lateral shifting of said stud relative to said attaching part when said head is entered therethrough, said aperture being slightly less in diameter than the major diameter of said head when expanded so as to hold said attaching part and stud in assembly prior to being secured to a support.

4. A fastener installation comprising, in combination, a stud member having a base portion located in a recess provided in a stud support, an attaching plate overlying a portion of the base of said stud and a plurality of attaching portions extending from said attaching plate into the support and lying in substantially the same plane as the rest of said attaching plate thereby to secure said stud member to its support.

5. A fastener installation comprising, in combination, a stud member having a base portion located in a recess provided in a stud support, an attaching plate overlying a portion of the base of said stud and a plurality of attaching portions extending from said attaching plate into the support and lying in substantially the same plane as the rest of said attaching plate thereby to secure said stud member to its support, said stud member also presenting a head and neck portion which extends through an aperture in said attaching plate, said stud being shiftable in any transverse direction relative to the attaching plate and the stud support.

6. A stud unit comprising a stud member having contractible and expansible head and neck portions and a base, and an attaching plate presenting an aperture therethrough of smaller diameter than the normal diameter of the head of the stud through which the head is snapped to secure the two parts together and a plurality of initially bent pointed attaching portions presented at the outer periphery of said attaching plate for securing said unit to a support.

In testimony whereof, I have signed my name to this specification.

FRED S. CARR.